(12) United States Patent
Devine (10) Patent No.: US 8,275,489 B1
(45) Date of Patent: Sep. 25, 2012

(54) SYSTEMS AND METHODS FOR DEPLOYMENT OF WIND TURBINES

(76) Inventor: Timothy J. Devine, Ojai, CA (US)

( * ) Notice: Subject to any disclaimer, the term of this patent is extended or adjusted under 35 U.S.C. 154(b) by 326 days.

(21) Appl. No.: 12/488,482

(22) Filed: Jun. 19, 2009

Related U.S. Application Data

(60) Provisional application No. 61/171,359, filed on Apr. 21, 2009.

(51) Int. Cl.
G05D 3/12 (2006.01)
G05D 5/00 (2006.01)
G05D 9/00 (2006.01)
G05D 11/00 (2006.01)
G05D 17/00 (2006.01)
F03D 9/00 (2006.01)
H02P 9/04 (2006.01)
H02J 1/00 (2006.01)
H02J 3/00 (2006.01)

(52) U.S. Cl. ........ 700/287; 700/291; 700/295; 700/297; 290/44; 290/55; 307/69; 307/84

(58) Field of Classification Search .................. 700/286, 700/287, 291, 295–297; 290/1 R, 7, 43, 290/44, 54, 55; 307/43, 69, 80, 82, 84; 415/2.1, 415/4.2; 416/1, 9, 23, 36, 40, 132 B, 147; 702/182–184
See application file for complete search history.

(56) References Cited

U.S. PATENT DOCUMENTS

| | | | |
|---|---|---|---|
| 3,754,147 A | 8/1973 | Hancock et al. | |
| 4,184,084 A | 1/1980 | Crehore | |
| 4,228,362 A | 10/1980 | Jacobs et al. | |
| 4,279,124 A | 7/1981 | Schremp | |
| 4,310,396 A | 1/1982 | Demaire et al. | |
| 4,311,011 A | 1/1982 | Lewis | |
| 4,335,093 A | 6/1982 | Salomon | |
| 4,363,703 A | 12/1982 | ElDifrawi et al. | |
| 4,452,046 A | 6/1984 | Valentin | |
| 4,462,213 A | 7/1984 | Lewis | |
| 4,776,171 A | 10/1988 | Perry, Jr. et al. | |
| 4,781,029 A | 11/1988 | SerVaas | |
| 4,883,823 A | 11/1989 | Perry, Jr. et al. | |

(Continued)

FOREIGN PATENT DOCUMENTS

EP 1321543 6/2003

(Continued)

OTHER PUBLICATIONS

"DOE Hydrogen Program: DOE H2A Delivery Analysis", http://www.hydrogen.energy.gov/h2a_delivery.html?, printed Sep. 17, 2007, in 4 pages.

(Continued)

Primary Examiner — Crystal J Barnes-Bullock (57) ABSTRACT

Systems and methods for generation and distribution of commercial wind power are provided. In one embodiment, a deployment method centers on the commercial deployment of small sized wind turbines that use existing power poles or similar structures to place the wind turbines high above the tree lines and in a clean air flow regime. This deployment can be free of any land needs, and can generate substantial electrical energy without any new poles in the sky line. Each wind turbine can provide power directly to the power grid at the point of generation for usage close to the point of generation. The power produced by each wind turbine can be metered at the wind turbine, or the point of generation.

20 Claims, 8 Drawing Sheets

U.S. PATENT DOCUMENTS

| | | | |
|---|---|---|---|
| 4,954,052 A | 9/1990 | Simmons | |
| 5,512,145 A | 4/1996 | Hollenberg | |
| 5,512,787 A | 4/1996 | Dederick | |
| 5,592,028 A | 1/1997 | Pritchard | |
| 5,900,330 A | 5/1999 | Kagatani | |
| 6,021,569 A | 2/2000 | Bannister et al. | |
| 6,100,600 A | 8/2000 | Pflanz | |
| 6,104,097 A | 8/2000 | Lehoczky | |
| 6,211,643 B1 | 4/2001 | Kagatani | |
| 6,263,568 B1 | 7/2001 | Bannister et al. | |
| 6,459,231 B1 | 10/2002 | Kagatani | |
| 6,512,966 B2* | 1/2003 | Lof et al. | 700/291 |
| 6,569,298 B2 | 5/2003 | Merida-Donis | |
| 6,605,880 B1* | 8/2003 | Jaunich | 307/80 |
| 6,610,193 B2 | 8/2003 | Schmitman | |
| 6,645,442 B2 | 11/2003 | Kaneko et al. | |
| 6,841,893 B2 | 1/2005 | Mainwald et al. | |
| 6,864,596 B2 | 3/2005 | Maiwald et al. | |
| 6,918,350 B1 | 7/2005 | Morse | |
| 7,000,395 B2 | 2/2006 | Wai et al. | |
| 7,013,203 B2* | 3/2006 | Moore et al. | 700/286 |
| 7,071,579 B2* | 7/2006 | Erdman et al. | 290/55 |
| 7,075,189 B2 | 7/2006 | Heronemus et al. | |
| 7,178,337 B2 | 2/2007 | Pflanz | |
| 7,199,482 B2 | 4/2007 | Hopewell | |
| 7,227,275 B2* | 6/2007 | Hennessy et al. | 290/55 |
| 7,228,812 B2 | 6/2007 | Morse | |
| 7,276,810 B2 | 10/2007 | Mohring | |
| 7,282,807 B2* | 10/2007 | Hornemann et al. | 290/44 |
| 7,296,974 B2* | 11/2007 | Wobben | 416/132 B |
| 7,303,369 B2* | 12/2007 | Rowan et al. | 415/4.2 |
| 7,315,769 B2 | 1/2008 | Balan et al. | |
| 7,318,154 B2* | 1/2008 | Tehee, Jr. | 713/155 |
| 7,322,794 B2* | 1/2008 | LeMieux et al. | 416/40 |
| 7,329,099 B2 | 2/2008 | Hartman | |
| 7,352,074 B1 | 4/2008 | Pas | |
| 7,391,126 B2* | 6/2008 | Liu et al. | 290/44 |
| 7,453,164 B2 | 11/2008 | Borden et al. | |
| 7,476,985 B2* | 1/2009 | Llorente Gonzalez | 290/44 |
| 7,484,363 B2* | 2/2009 | Reidy et al. | 60/398 |
| 7,492,053 B2* | 2/2009 | Fein et al. | 290/44 |
| 7,571,013 B2* | 8/2009 | Altemark | 700/34 |
| 7,591,176 B2* | 9/2009 | Stein | 73/170.01 |
| 7,677,075 B2* | 3/2010 | Nies | 73/1.01 |
| 7,781,112 B2 | 8/2010 | Sridhar et al. | |
| 7,839,024 B2* | 11/2010 | Cardinal et al. | 307/84 |
| 7,911,071 B2* | 3/2011 | Devine | 290/1 R |
| 7,952,217 B2* | 5/2011 | Nielsen et al. | 290/44 |
| 7,953,519 B2* | 5/2011 | Hamilton et al. | 700/295 |
| 2006/0082160 A1 | 4/2006 | Lee | |
| 2007/0052242 A1* | 3/2007 | Mascarin | 290/1 R |
| 2008/0091590 A1* | 4/2008 | Kremen | 705/38 |
| 2008/0195255 A1* | 8/2008 | Lutze et al. | 700/291 |
| 2009/0115190 A1 | 5/2009 | Devine | |
| 2009/0153656 A1* | 6/2009 | Sharonova | 348/125 |
| 2009/0191057 A1* | 7/2009 | Knutson | 416/23 |
| 2009/0200808 A1* | 8/2009 | Parmley, Sr. | 290/55 |
| 2009/0202346 A1* | 8/2009 | Baron | 416/9 |
| 2009/0204266 A1* | 8/2009 | Lovmand et al. | 700/287 |
| 2009/0212563 A1* | 8/2009 | Morjaria | 290/44 |
| 2009/0224606 A1* | 9/2009 | Gandy | 307/69 |
| 2009/0224607 A1* | 9/2009 | Kjaer et al. | 307/82 |
| 2009/0280147 A1* | 11/2009 | Caffrey | 416/147 |
| 2009/0299780 A1* | 12/2009 | Sarkar et al. | 705/7 |
| 2009/0317250 A1* | 12/2009 | Gamble et al. | 416/1 |
| 2010/0010686 A1* | 1/2010 | Shore et al. | 700/297 |
| 2010/0017045 A1* | 1/2010 | Nesler et al. | 700/296 |
| 2010/0092290 A1* | 4/2010 | Aaron | 416/9 |
| 2010/0094474 A1* | 4/2010 | Larsen et al. | 700/287 |
| 2010/0102569 A1* | 4/2010 | Pickard, III | 290/55 |
| 2010/0114395 A1* | 5/2010 | Hinatsu et al. | 700/295 |
| 2010/0135798 A1* | 6/2010 | Eggleston | 416/36 |
| 2010/0213711 A1* | 8/2010 | Maglaque | 290/43 |
| 2010/0258449 A1 | 10/2010 | Fielder | |
| 2010/0268849 A1* | 10/2010 | Bengtson et al. | 709/248 |
| 2010/0329840 A1* | 12/2010 | Farb | 415/2.1 |
| 2011/0101692 A1* | 5/2011 | Bilaniuk | 290/44 |
| 2011/0109094 A1* | 5/2011 | Kenway et al. | 290/55 |
| 2011/0144949 A1* | 6/2011 | Siew et al. | 702/184 |

FOREIGN PATENT DOCUMENTS

| | | |
|---|---|---|
| GB | 2195659 | 4/1988 |
| GB | 2263734 | 8/1993 |
| GB | 2383978 | 7/2003 |
| GB | 2425334 | 10/2006 |
| JP | 55116601 | 9/1980 |
| JP | 62-20889 | 1/1987 |
| JP | 11228101 | 8/1999 |
| JP | 2001-172001 | 6/2001 |
| JP | 2001-304091 | 10/2001 |
| JP | 2005-027361 | 1/2005 |
| JP | 2005-145218 | 6/2005 |
| WO | WO 2007/025387 | 3/2007 |

OTHER PUBLICATIONS

"Hydrogen for transport and the B&E report", http://planetforlife.com/h2/h2swiss.html, printed Sep. 17, 2007, in 6 pages.

"Peterhead Hydrogen power-a world first for low-carbon electricity", http://www.peterheadhydrogenpower.com/go/site/1141/, printed Sep. 28, 2007, in 1 pages.

"3.6 MW Offshore Series Wind Turbine", GE Energy Brochure, 2005 in 4 pages.

"3.6 MW Wind Turbine Technical Specifications", http://www.gepower.com/prod_serv/products/wind_turbines/en/36mw/36mw_data.htm, printed Dec. 9, 2010, in 3 pages.

"Alaska Mainland Regions 50 m Wind Power", http://www.eere.energy.gov/windandhydro/windpoweringamerica/images/windmaps/ak_50m_800.jpg, printed Sep. 15, 1006, in 1 page.

"Atmospheric Electrolysers: 60 Nm3/h—485 Nm3/h",http://www.hydro.com/electrolysers/en/products/range/atmospheric_electrolyser/index.html, printed Aug. 10, 2007, in 2 pages.

"California Wind Resources: Annual Wind Speed at 70 Meter Elevation", http://www.energy.ca.gov/maps/wind/WIND_SPEED_70M.jpg, printed May 25, 2007, in 1 page.

"Department of Transportation: Statement Regarding a Coordinated Framework for Regulation of a Hydrogen Economy", Federal Register, Jan. 5, 2007, pp. 609-624, vol. 72, No. 3.

"Ecowind—Energy Concepts", http://www.ecowindenergy.com/applications.html, printed Sep. 14, 2007, in 1 page.

"Facts: Key information on the Utsira project", Apr. 4, 2004, http://www.hydro.com/en/press_room/news/archive/no_news_view/hydrogen_iceland/utsira..., in 2 pages.

"Feature Report—Environmental Business: Kawasaki is Committed to Contributing to the Realization of a 'Hydrogen Energy Society' that is Friendly to the Environment", KHI Environmental Report 2005, pp. 19-20.

"Floating windmills", http://www.hydro.com/en/Press-room/News?historic-news-archive/2005/November/Floating-windmills/, Nov. 2, 2005, in 3 pages.

"Floating Windmills", Hydro Brochure, www.hydro.com, in 4 pages.

"Gas station first in U.S. to pump hydrogen", Nov. 11, 2004, http://www.msnbc.msn.com/id/6460036/print/1/displaymode/1098/, in 1 pages.

"Hydro continues Utsira project," Nov. 25, 2005, http://www.hydro.com/en/press-room/News/Historic-news-archive/2005/November/Hydro-continues-Utsira-project/, in 2 pages.

"Hydro opens worlds first hydrogen station on Iceland", http://www.ideasinaluminium.com/en/Press-room/News/Historic-news-archive/2003/April/Hydro-opens-worlds-first-hydrogen, Apr. 24, 2003, in 2 pages.

"Hydrogen Energy", Peterhead, Scotland, http://www.hydrogenenergy.com/FullStory.aspx?m=17, printed Sep. 28, 2007 in 1 page.

"Hydrogen fuelling stations", Hydro Oil & Energy Brochure, www.hydro.com, in 3 pages.

"Map Title Detailed Wind Speed at 70 Meters Elevation", ESRI ArcExplorer 2.0, printed May 25, 2007, in 1 page.

"Map Title Power at 50 meters", ESRI ArcExplorer 2.0, printed May 25, 2007, in 1 page.

"NETL: Turbines-Coal and Power Systems Turbines", National Energy Technology Laboratory, http://www.netl.doe.gov/technologies/coalpower/turbines/index.html, in 2 pages.
"Power from the hydrogen plant on Utsira", Apr. 14, 2004, http://www.hydro.com/en/press-room/News/archive/2004/April/Power-from-the-hydrogen-plant-on-Utsira/, in 2 pages.
"Products", http://www.hydro.com/electrolysers/en/products/index.html, printed Aug. 15, 2006, in 2 pages.
"Renewable Energy Applications on Santa Rosa Island", Channel Islands National Park, http://www.nps.gov/archive/chis/esri.htm, printed on Sep. 6, 2006, in 7 pages.
"Santa Rosa Island, California—Wikipedia, the free encyclopedia", http://www.wikipedia.org/wiki/Santa_Rosa_Island,_California, printed Sep. 6, 2006, in 1 page.
"Transporting Hydrogen", Nanopedia, http://nanopedia.case.edu/NWPage.php?page=hydrogen.transport, printed Aug. 10, 2007, in 1 page.
"United States Annual Average Wind Power", in 1 page.
"Utsira—a hydrogen community show room", Sep. 11, 2003, http://www.hydro.com/en/press_room/news/archive/2003_09/utsira_en.html, in 4 pages.
"West Coast Regional Carbon Sequestration Partnership Annual Business Meeting", Nov. 9, 2006, Phoenix, AZ, in 7 pages.
"Wind Classes for US-DOE Wind Maps", http://www.bergey.com/Maps/Wind_Classes.htm, printed Sep. 14, 2006, in 1 page.
"Winds of change", http://www.hydro.com/en/our_business/oil_energy/new_energy/hydrogen/winds_change.html, printed Aug. 15, 2006 in 1 page.
"California Wind Resources: Annual Wind Power at 50 Meter Elevation", http://energy.ca.gov/maps/wind/WIND_POWER_50M.jpg, printed May 25, 2007, in 1 page.
Abe, A. et al., Studies of the large scale sea transportation of the liquid hydrogen, http://www.enaa.or.jp/WE-NET/ronbun/1996/e1/ishikawa1996.html, 1996, pp. 10.
Addison, John, "Carson Hydrogen Power Plant: BP and GE Plan Multi-Billion Dollar Clean Hydrogen Power Plants", http://www.cleanfleetreport.com/vault/carson.htm, Jul. 20, 2006, in 3 pages.
Ballem, Jamie, Energy Framework and Renewable Energy Strategy, Department of Environment and Energy, Jun. 2004, pp. 40, Prince Edward Island, Canada.
Bossel, et al., The Future of the Hydrogen Economy: Bright or Bleak?, www.efcf.com/reports, 2003, pp. 39.
Definition of Hydrogen Delivery, 1 page.
Devine, Tim, "Certification of Container Chassis" in 5 pages.
Devine, Tim, "Design Considerations", in 4 pages.
Gabbard, Alex, "Coal Combustion: Nuclear Resource or Danger", http://www.ornl.gov/info/ornlreview/rev26-34/text/colmain.html, vol. 26, No. 3 & 4, 1993, in 9 pages.
H2A Delivery Components Model Version 1.1: Users Guide, Apr. 7, 2006, in 194 pages.
HFCIT Hydrogen Delivery: Current Technology. U.S. Department of Energy—Energy Efficiency and Renewable Energy Hydrogen, Fuel Cells and Infrastructure Technologies Program-Hydrogen Delivery. http://www1.eere.energy.gov., in 3 pages.
Hydro, Kevin, Hydrogen Cars and Vehicles Blog, Rochester Hydrogen Village People Enthused, http://www.hydrogencarsnow.com/blog/2007/08/rochester-hydrogen-village-people.html, Aug. 29, 2007, Pages in 2 pages.
Hydrogen economy, Wikipedia, the free encyclopedia, pp. 17.
Hydrogen Equivalents Table, in 2 pages.
Hydrogenics Presentation Slides, Prince Edward Island, Energy Corporation, in 27 pages.
Kalyanaraman, Kalyan, "Turkish plant launches GE turbine", Turbomachinery International, Nov./Dec. 2005 in 6 pages.
Kema Consulting and Lievense Consulting Engineers, Energy Island, Phase 1 Feasibility Study Executive Summary, Jul. 2, 2007, pp. 17, Arnhem, The Netherlands.
Lee, Kenneth, Economic Feasibility of Producing Hydrogen Using Excess Electricity From Wind Turbines on the Big Island of Hawaii, World Renewable Energy Congress VIII, Sentech, Inc, Sep. 3, 2004, pp. 21, Denver, Colorado, USA.
Oldenburg, Curt, "West Coast Regional Carbon Sequestration Partnership Annual Business Meeting", Phoenix, AZ, Nov. 8, 2006, in 11 pages.
Pehnt, Martin, LCA Case Studies-Future Energy and Transport Systems, 2003, pp. 365-378, Heidelberg, Germany.
Richards, Mark E., "Underground LH2 Off-Board Hydrogen Storage Technology", U.S. Department of Energy 2005 Hydrogen Program Review, May 25, 2005, in 25 pages.
Starr, F. et al., "Flexibility in the production of hydrogen and electricity from fossil fuel power plants", Proceedings International Hydrogen Energy Congress and Exhibition 2005, Instanbul, Turkey, Jul. 13-15, 2005, in 10 pages.

* cited by examiner

SYSTEMS AND METHODS FOR DEPLOYMENT OF WIND TURBINES

This application claims benefit under 35 U.S.C. §119(e) to U.S. Provisional Patent Application No. 61/171,359, filed Apr. 21, 2009, which is incorporated in its entirety by reference herein.

BACKGROUND OF THE INVENTION

1. Field of the Inventions

This application relates to systems and methods for deployment of wind turbines for the distributed commercial generation of electricity.

2. Description of the Related Technology

Wind is the movement of air, which has mass, and when air is in motion it contains kinetic energy. A wind energy system converts the kinetic energy of wind into mechanical or electrical energy that can be harnessed for practical use. Wind energy systems which harness the wind and convert it to electrical energy are generally referred to as wind turbines. As air flows past the rotor of a wind turbine, the rotor spins and drives the shaft of an electrical generator to produce electricity. The electricity generated by a wind turbine can be collected and fed into utility power lines, where it is mixed with electricity from other power plants and delivered to utility customers.

Wind turbines are routinely placed in groups. These groups of wind turbines are referred to as wind farms. Wind farms have been in existence for many years and are located in many countries. In the United States, the Department of Energy publishes a report each year that identifies details relative to the wind farms in the United States. Wind farms generally refer to large scale, commercial electricity producing operations. The capacity of the wind turbines on large wind farms, at least in 2008, can reach nearly 3 Mega Watts per wind turbine, and a wind farm can have 1000 wind turbines or more. The goal and direction of wind energy producers appears to be larger farms with greater capacity. These wind farms generally require a large tract of land and transmission lines with significant capacity to transmit the power that is generated from the wind turbines.

Another form of wind turbine deployment is the residential, rural and/or non-commercial placement of small wind turbines. These turbines are generally placed to reduce household electric bills and/or provide electricity in locations that do not have electric power available. Typical locations can be remote pumping stations, farming operations, boats, or any other location where electric power is required and not commercially available. These units typically have a rated capacity, for example, of 50 kilowatts or less and are placed as single units or in small groups that do not exceed 50 units. They are not deployed to provide commercial power.

Typically, electricity is generated in centralized locations and then distributed by means of power transmission lines to the power grid and end user of the electricity. Examples of this type of generation can be a typical large wind farm that has the capacity to generate a megawatt or more, or a coal fired power plant that runs a 40 megawatt (more or less) steam turbine or a nuclear power plant. These are examples of large centralized power generation facilities which generate power in the United States.

SUMMARY OF THE INVENTIONS

Systems for producing distributed electricity to a power grid using wind turbines are provided, the systems comprising a plurality of wind turbines attached to existing structures where a connection to a power grid is already available. Each of said wind turbines can comprise a generator that produces electrical energy from kinetic energy stored in the wind. Each turbine can be directly connected to the power grid and configured to supply power through that connection to the power grid, and each of the wind turbines can be configured to produce electrical energy that matches the power and frequency of the power wires at the wind turbine's attached existing structure.

Methods of distributing power to an existing electronic power grid are also provided, the methods comprising attaching a plurality of wind turbines to existing structures where a connection to a power grid is already available, each of said wind turbines comprising a generator that produces electrical energy from kinetic energy stored in the wind. The methods also comprise directly connecting each wind turbine to the power grid in order to supply power through that connection to the power grid, and monitoring transmission data from meters on each of the wind turbines. Systems and methods for automatic meter reading (AMR) are also provided.

DETAILED DESCRIPTION OF THE PREFERRED EMBODIMENT

The present application relates to electricity production systems that utilize wind turbines placed on top of existing power poles for the production of electrical energy. It has been discovered that such systems can operate in a self sustaining manner and directly provide extensive amounts of distributed electrical power to the electric power grid. These systems can use the existing power infrastructure to distribute electrical energy, and can have zero new land requirements.

Generally, an optimal location for the placement of a wind turbine is high above the ground where there is an unobstructed high energy, high velocity wind. For example, at a 10 meter elevation, wind power densities of greater than 250 $W/m^2$ of wind energy can be obtained. In some instances, such a location can obtain greater than 400 $W/m^2$, while in other instances, greater than 800 $W/m^2$, with a higher wind power density being more preferable. In at least some embodiments, the wind power density at a 10 meter elevation can be greater than 1000 W/m². All of the aforementioned locations for wind turbine placement, in combination with the systems described herein, can provide an optimal environment and system for the production of electricity in a self-sustaining manner. Various elements of such facilities are further described below.

Wind Turbines

With reference to FIGS. 1-6, embodiments of the system 10 described herein can include one or more wind turbines 12 mounted on existing power poles, light poles, power transmission towers, and/or any other existing tall structure or pole where power can be connected to an existing power grid. In particular embodiments, a plurality of wind turbines can create electrical power that is supplied to the power grid via the power wires that are attached to the pole where the turbine is mounted.

In some embodiments, the wind turbines can comprise a plurality of 0.1 to 10 kW wind turbines. In yet other embodiments, the wind turbines can comprise a plurality of 3 to 15 kW wind turbines. Other ranges are also possible.

The collective energy produced from the wind turbines can vary according to the number of wind turbines and the average wind speed. For example, in some embodiments, the plurality of wind turbines can have a total annual energy yield of between about 2 to about 10,000 MW output. Other ranges and/or outputs are also possible, including but not limited to ranges exceeding 10,000 MW on their high end.

Winds can vary at the location of the wind turbines 12. Thus, in some embodiments, the annual average wind speed at the location of the plurality of wind turbines can range, for example, between 3 to about 25 meters per second (m/s) at the elevation of the wind turbine hub. In yet other embodiments, the annual average wind speed at the location of the plurality of wind turbines can range be between 3 to about 9 m/s. In yet other embodiments, the annual average wind speed at the location of the plurality of wind turbines can range be between 7 to about 15 m/s. In yet other embodiments, the annual average wind speed of the location of the plurality of wind turbines can range be between 9 to about 30 m/s. Other ranges and/or average wind speeds are also possible.

In at least some embodiments, each of the plurality of wind turbines 12 can be optimally selected to match the pole spacing for the efficient utilization of wind energy. In some embodiments, the turbine selection can depend on a variety of factors, such as those described above, including but not limited to the blade diameter of each wind turbine, the surface of the land in the area in which the wind turbine is located, the approximate location of other wind turbines, surface conditions of the land, the angle of the wind, wind turbulence, wind gusts, wind variations, the pole height, and the mounting height of the wind turbine.

The turbines 12 can be of various configurations, shapes, and styles. For example, and with reference to FIG. 4, vertical wind turbines can be used, as can other types or shapes of wind turbines, including horizontal wind turbines. In some embodiments, the blade diameter of each wind turbine can range between 2 and 38 feet. Other ranges are also possible. Additionally, meters, power conditioning equipment, inverters, transformers and/or transmission capabilities can be incorporated into the system as needed.

Figure 1:
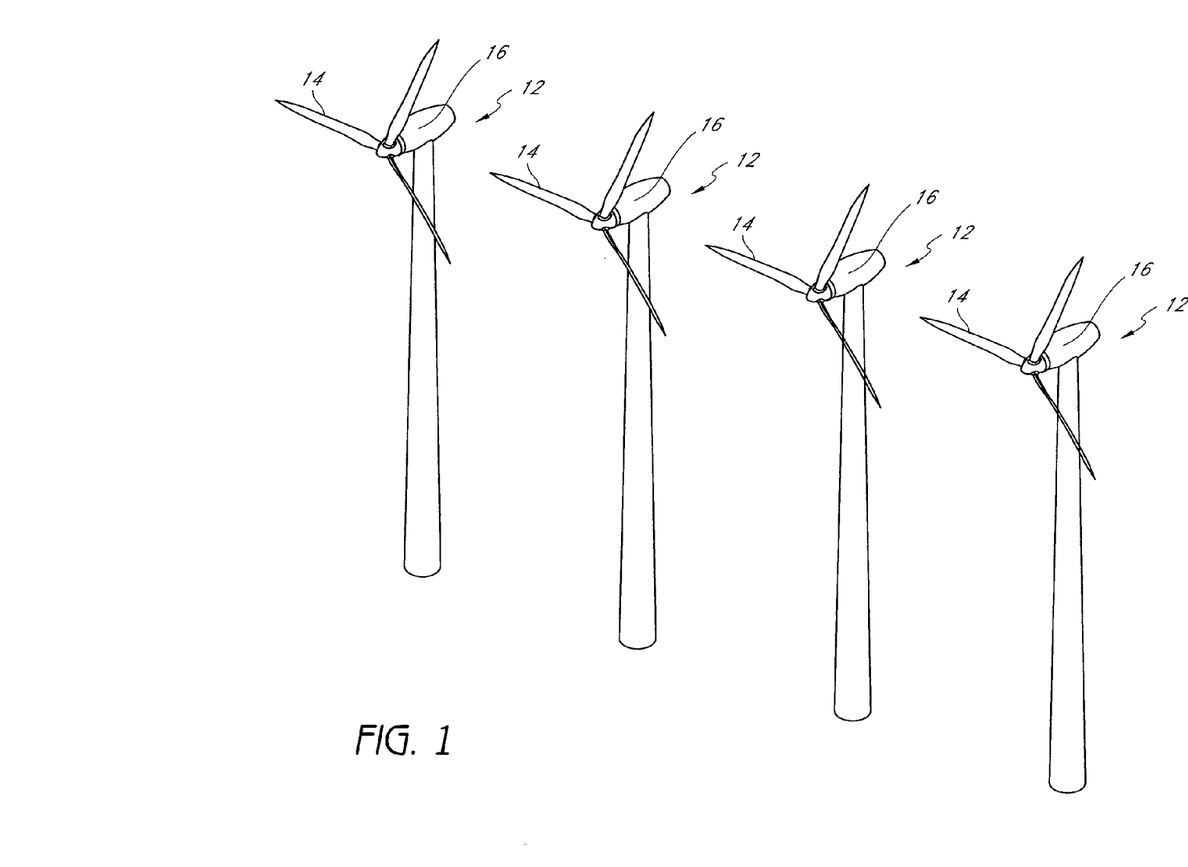
FIG. 1 is an illustration of an embodiment of a system including a large scale wind farm with high output wind turbines.
Figure 2:
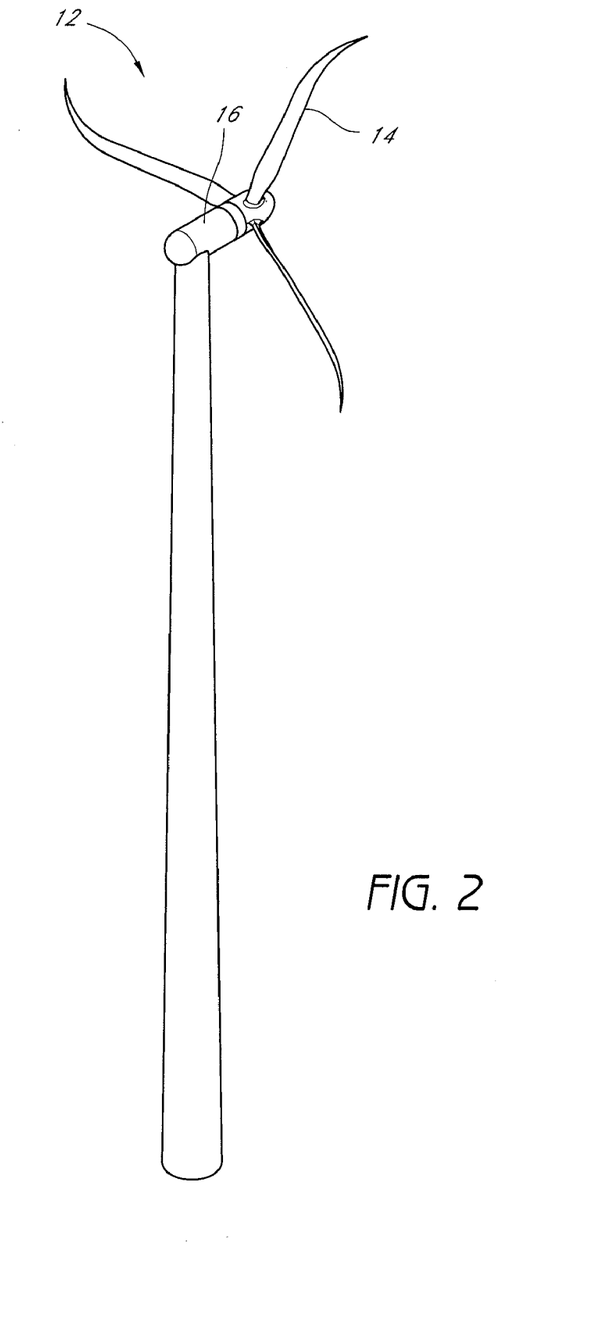
FIG. 2 is an illustration of an embodiment of a system including a wind turbine placed on top of a pole that is about 30' tall.
Figure 3:
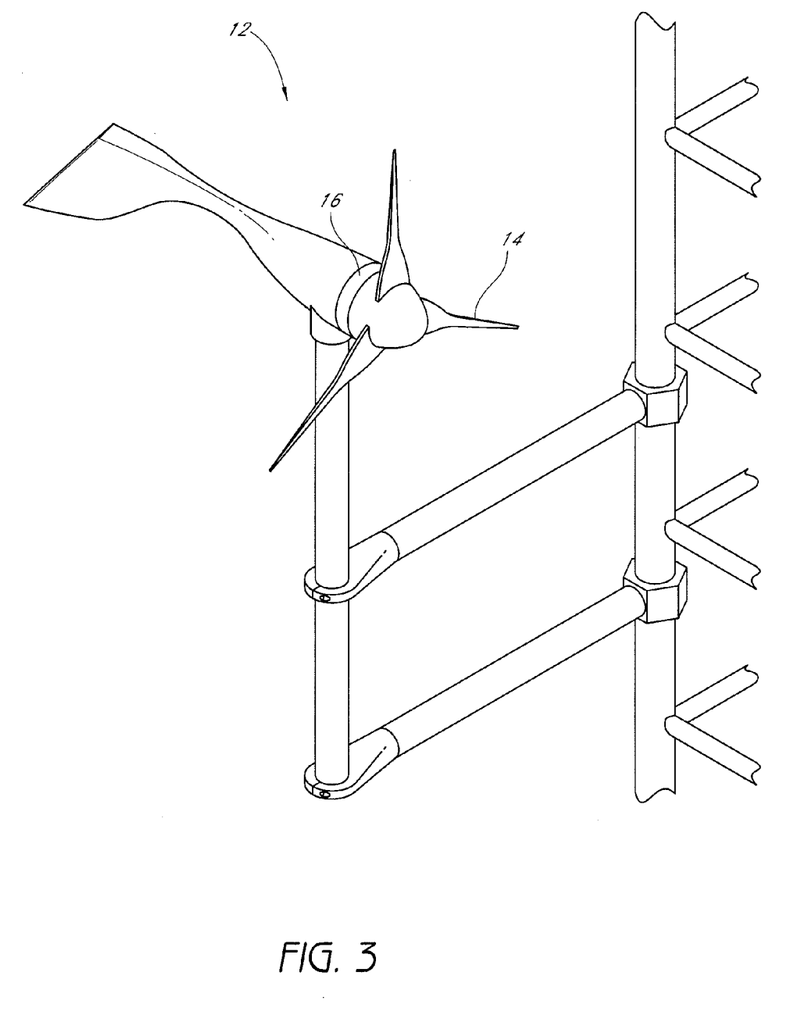
FIG. 3 is an illustration an embodiment of a system including a wind turbine mounted to a tower.
Figure 4:
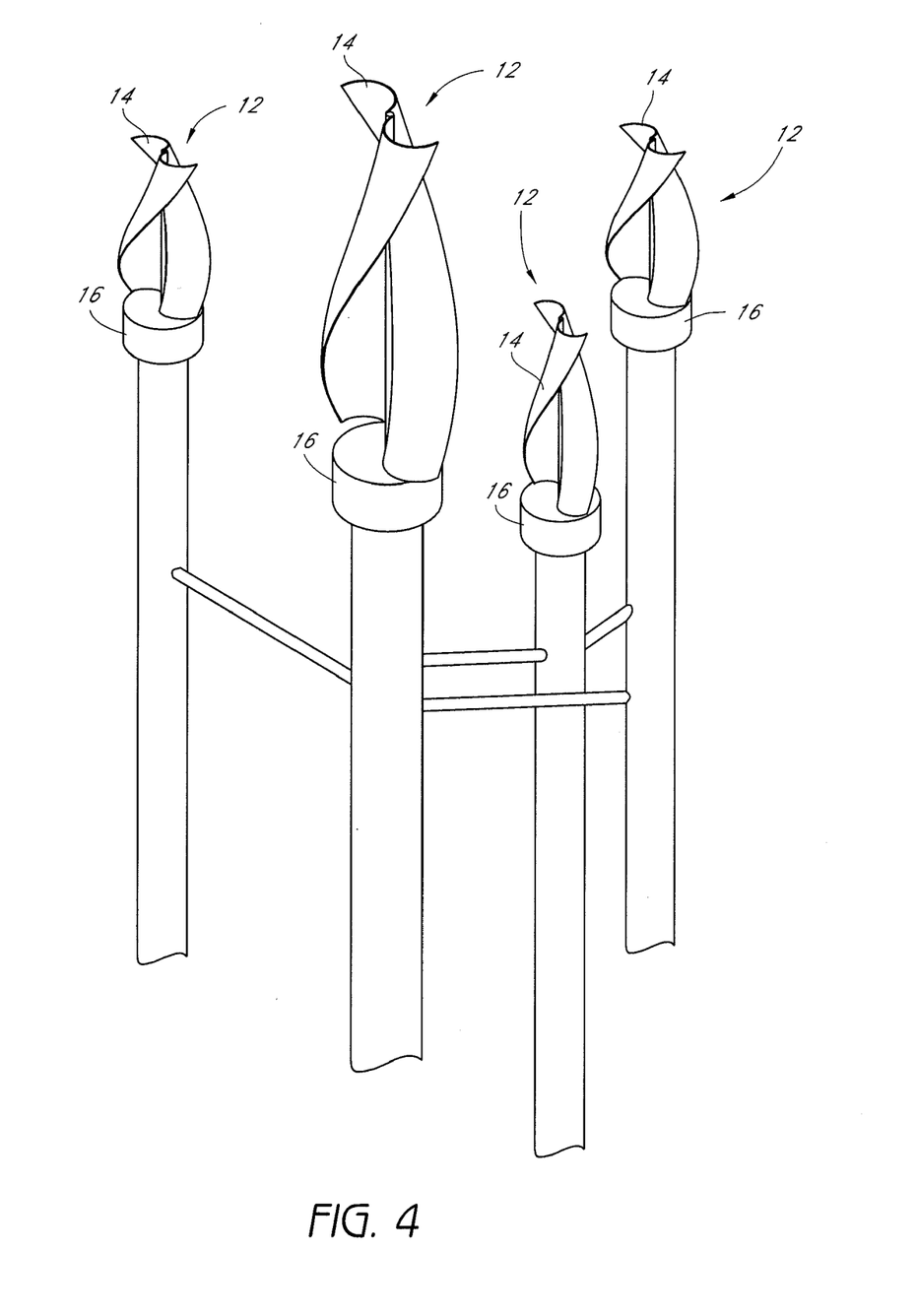
FIG. 4 is an illustration of an embodiment of a system including small vertical wind turbines.
Figure 5:
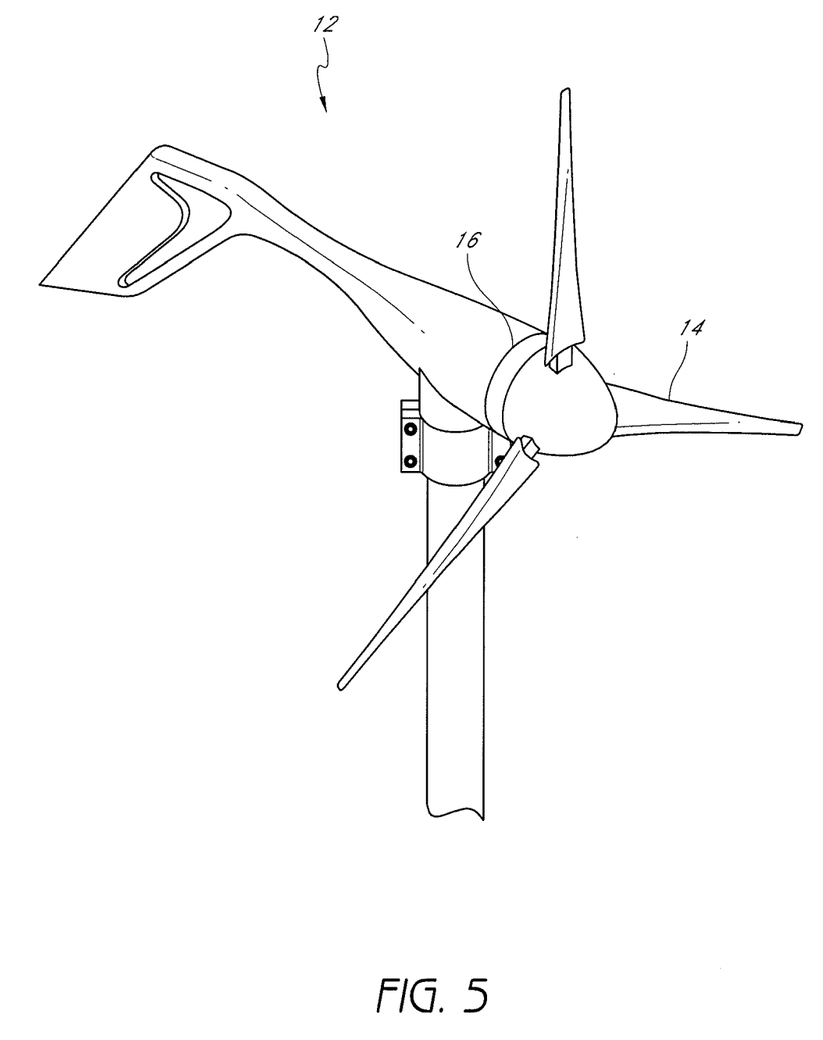
FIG. 5 is an illustration of an embodiment of a system including Southwest Windpower's Air Breeze wind turbine mounted to a pole.
Figure 6:
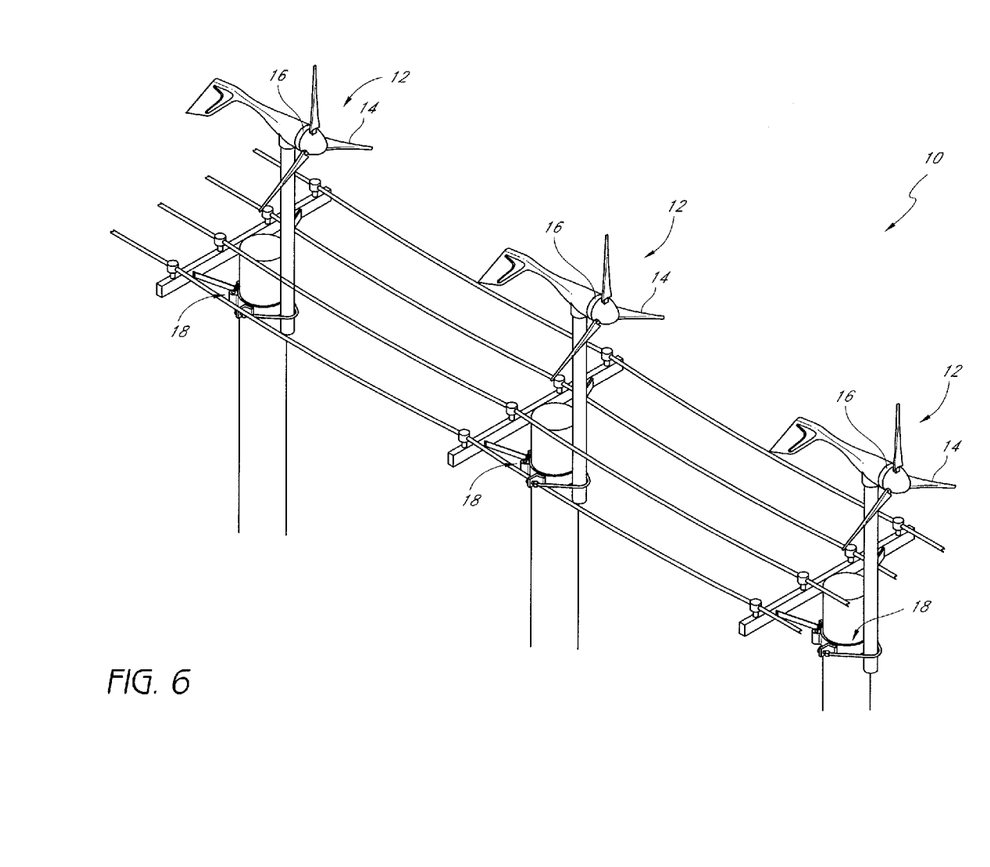
FIG. 6 is an illustration of an embodiment of a system which includes a group of small wind turbines placed upon existing power poles.

With reference to FIGS. 5 and 6, a wind turbine that can be used according to some embodiments is the Southwest Windpower "Air Breeze" wind turbine. This wind turbine has a rotor diameter of about 4 feet and a fixed blade pitch. In some embodiments, turbines with variable pitch blades can be used. In some embodiments, a plurality of wind turbines from various manufactures can be used at one time, each such turbine having different output capacities and other design features suitable for its location in the system.

Variable pitch rotor blades. The pitch of the rotor blade is the angle of the blade relative to the wind passing over it. It is similar to the threads of a screw in that a screw with a pitch of 10 threads per inch, will move one inch forward (or backward) for every 10 turns. These ten turns will require a certain amount of torque to turn the screw. If the same screw had a pitch of 20 threads per inch, it would take 20 turns to move it one inch forward. This represents an increase it the number of turns required to move the screw one inch but the required torque to accomplish each turn would be reduced. Turbine blade pitch works on the same principle. The lower the pitch the easier it is to start the blades turning. This translates to the low wind start-up point, or wind speed at which the turbine will start turning and producing electricity. For a commercial venture one wants to start producing electricity at the lowest wind speed possible. The draw back to a low pitch turbine blade is that it will be high wind speed limited. Meaning that it will have a limit at which the low blade pitch is reducing the conversion of kinetic wind energy to electrical energy. This is the limiting factor with a fixed pitch turbine blade. The pitch angle is a comprise between high wind efficiency and low wind start up. Fixed pitch turbine blades use a pitch that is optimized to be in the middle between high wind efficiency and low wind start up. This is where the benefit of variable pitch turbine blades comes into use. Variable pitch turbine blades increase the dynamic range over which the turbine operates. The pitch is reduced when only low wind speeds are available and the pitch is increased when high winds are available. This will maximize the energy conversion of the turbine which is the goal of a commercial operation.

The systems by which the turbine blade pitch is varied can be a mechanical system or an electro-mechanical system. In some embodiments the mechanical system typically uses a low pitch position as its default position. As wind flow starts the turbine turns, as the turbine speed increases a set of springs and weights on the turbine shaft rotate with the blades and shaft. As the shaft increases in speed the weights (often called fly weights) move outward due to the increased centripetal force. As the weights move they are coupled to a gearing system that increases the turbine blade pitch as the rotational speed of the turbine shaft increases. In addition to the mechanical system some embodiments will use an electro-mechanical system. The electro-mechanical system will monitor turbine shaft speed and adjust the blade pitch to optimize efficiency. The shaft speed reading can be determined with the use of a magnetic pick-up or similar device which would send a speed signal to an on board computer which would send a signal to the blade gearing system and adjust the blade pitch. In addition the pitch could be set based upon a wind speed signal from an anemometer. Setting the pitch based upon wind speed and/or a combination of wind speed and shaft speed would facilitate accurate pitch adjustment and could be used as a safety feature during very high wind conditions. This system would allow the blades to be turned into the wind and stop the turbine rotation during very high wind conditions. Basically an over speed protection system that would be used in conditions that exceed the operational envelope of the turbine.

Placement of the wind turbines 12 can vary. For example, in some embodiments the placement has been found optimal at lengths of between about 1.5 to 3 times the diameters of the blades from side to side, and at lengths of between about 7 to 13 times the diameter of the blades downwind from the other wind turbines. Other placement configurations are also possible.

The output of a wind turbine 12 can depend on a number of factors, including the turbine's size and design, the speed of wind passing through the rotor, the amount of time each day that wind is available, and the number of days per year that the wind is available. The energy that wind contains is a function of the speed of the wind, or the kinetic energy of the wind. For example, a wind turbine at a site with a 10 meter per second wind speed can generate 70% more energy than a wind turbine at a site with an 8 meter per second wind speed.

With reference to FIG. 5, small, horizontal wind turbines 12 generally consist of fixed pitch blades 14 that are attached to a rotating hub 16 which commonly revolves around a horizontal axis. The hub 16 is connected to a drive shaft/generator armature. This generator can produce DC electric power. The current can then be converted to AC power by means of an integral grid tied inverter that can provide AC current which will match the frequency of power lines that it will be attached to.

Inverters work by taking the 12 or 24 volt DC voltage from the turbine (or any other output voltage) and chopping it. More specifically, turning the power on and off at grid supply frequency. In America the power frequency is 60 cycles per second (60 Hz). This is accomplished by using a local oscillator and a power transistor. This generated frequency has to be matched in phase to the phase of the power grid. This means the local oscillator has to be synchronized with the grid. The next key is that the voltage of the inverter output needs to be variable to allow it to be slightly higher than the grid voltage to enable current to flow out to the grid. This is done by sensing current flow and raising the voltage on the output (or duty cycle of the transformer input) until the current flow results in the resulting output power matching the input power from the DC supply. The chopped DC signal is then filtered to make it into a sine wave (removing the upper 3,5,7 harmonics that make up the square wave and then applying the power (voltage and current) to a transformer to up the voltage to 120 or 240 volts to match the transformed energy that is supplied from the grid, down stream of the typical utility transformer. This power can be used as 120 or 240 volt power or it can be "stepped up" by routing it through a utility transformer which will convert the voltage to the power line voltage on the mounting tower or any other desired voltage. The integral inverter will comply with utility electrical standards such that the output power will be clean, undistorted and in phase with the AC grid. The inverter will have a fixed power factor of one, which means its output voltage and current are perfectly lined up, and its phase angle will be within 1 degree of the AC power grid. The inverter will have a built in computer which will sense the current AC grid waveform, and output a voltage that corresponds to the grid. A transformer is a common electrical device that in simplest terms is two sets of windings that will change the voltage of the power. In an ideal transformer, the induced voltage in the secondary winding (VS) is a fraction of the primary voltage (VP) and is given by the ratio of the number of secondary turns to the number of primary turns:

$$\frac{V_S}{V_P} = \frac{N_S}{N_P}$$

By appropriate selection of the numbers of turns, a transformer thus allows an alternating voltage to be stepped up—by making NS more than NP—or stepped down, by making it less.

Transformers come in a range of sizes from a thumbnail-sized coupling transformer to huge units weighing hundreds of tons used to interconnect portions of national. All operate with the same basic principles, although the range of designs is wide. Transformers are essential for high voltage power transmission, which makes long distance transmission economically practical.

In some embodiments, high voltage such as 12,000 volts or more would be desirable in the system 10. Long run transmission lines can have voltages of 138,000, 230,000, 345,000, 500,000, 765,000 volts or even higher voltages. These voltages would be generated with the appropriate transformers. This is because voltage is a function of Ohms law and power. For a set amount of power, if the voltage goes up, the current goes down, and higher current is associated with higher losses in the power line. In some embodiments, an example of a final output power can be 220 volt 60 Hz, 440 volt 60 Hz, or another common power format in America. Other power outputs are also possible. In Europe, the frequency of the AC electrical power is generally 50 Hz. Therefore, in some embodiments of the system 10, the power conditioning equipment within the wind turbine 12 (inverter, transformer and/or rectifier) can match the power and frequency of the power wires at the specific location (e.g. telephone pole). In other words, the voltage and frequency of the power can be set to match the power of the lines where the connection is made.

Once deployed and generating electricity, the turbines' electrical generation can be monitored. For a commercial operation, one must generally get paid for any generated electricity. To accomplish this, an electrical meter can be integrated into the wind turbine between the inverter and the lines that connect to the power grid. This meter can provide a continuous reading of the power generated. The meter system can be powered by the wind turbine and have back-up batteries which the wind turbine charges. In some embodiments, the meter can use a short range radio signal to communicate electrical generation data for billing.

Depending upon the specific deployment location, one or more of many communication techniques can be used to communicate the meter data to a central billing location. Some of the more common forms of this type of communication are cable TV, internet access and telephone use on the same coaxial cable at the same time. Some mobile phone networks, like GSM, use the lower microwave frequencies. Microwave radio is used in broadcasting and telecommunication transmissions because, due to their short wavelength, highly directive antennas are smaller and therefore more practical than they would be at longer wavelengths (lower frequencies). The techniques that can be used to transmit the power data include but are not limited to;

Short range radio communication (900 MHz or 2.4 GHz for example).

Transmission by Infrared communication with a PDA, Laptop or other device.

Transmission by means of modem data transfer.

Ethernet data transfer

Carrier wave data transfer

Micro-wave data transfer

Transmission on telephone wires.

Transmission on coaxial wires or cables.

The data transmission can be by means of satellite telephone communication.

Direct meter reading.

The data collected can be in a DFI format (a standard power company data format) or other form identified by the local power company. Initially, the power data can be transferred by short range radio communication techniques where by a communication receiver is brought within 200 yards of the meter and the data is automatically transferred. The data transfer as a minimum can include meter serial number or node number and kilowatt hours transferred. The data transfer can also include temperature data, wind speed and direction data, vibration data, bearing temperature data and other maintenance data. Other meters can have the capability to transfer the data over much longer distances. This can be accomplished by use of satellite communication, such as a satellite telephone, microwave communication to a tower which would be routed to the correct office, connection to telephone and/or cable lines on the power poles with a modem or sending the information on the power lines with the use of another carrier signal technique. Currently Edison uses a Metri-Com system to transfer meter and power sub-station data as a signal that is carried on the power wires (the data is piggy backed on the power).

Data transfer can be done using a modem. The transfer of electronic information between a meter and a computer system begins with what is called handshaking. Handshaking makes it possible to connect relatively heterogeneous systems or equipment over a communication channel without the need for human intervention to set parameters. One classic example of handshaking is that of modems, which typically negotiate communication parameters for a brief period when a connection is first established, and thereafter use those parameters to provide optimal information transfer over the channel as a function of its quality and capacity. The "squealing" (which is actually a sound that changes in pitch 100 times every second) noises made by some modems with speaker output immediately after a connection is established are in fact the sounds of modems at both ends engaging in a handshaking procedure; once the procedure is completed, the speaker might be silenced, depending on the driver. Modem handshakes can often be muted by going to the control panel and selecting the appropriate options.

A modem is a device or program that enables a computer to transmit data over, for example, telephone or cable lines. Computer information is stored digitally, whereas information transmitted over telephone lines is transmitted in the form of analog waves. A modem converts between these two forms. The goal of a modem is to produce a signal that can be transmitted easily and decoded to reproduce the original digital data. Modems can be used over any means of transmitting analog signals, from driven diodes to radio.

The most familiar example is a voice band modem that turns the digital 1s and 0s of a personal computer into sounds that can be transmitted over the telephone lines of Plain Old Telephone Systems (POTS), and once received on the other side, converts those 1s and 0s back into a form used by a USB, Ethernet, serial, or network connection. Modems are generally classified by the amount of data they can send in a given time, normally measured in bits per second, or "bps". They can also be classified by Baud, the number of times the modem changes its signal state per second.

Baud is NOT the modem's speed. The baud rate varies, depending on the modulation technique used. Original Bell 103 modems used a modulation technique that saw a change in state 300 times per second. They transmitted 1 bit for every baud, and so a 300 bit/s modem was also a 300-baud modem. However, casual computerists confused the two. A 300 bit/s modem is the only modem whose bit rate matches the baud rate. A 2400 bit/s modem changes state 600 times per second, but due to the fact that it transmits 4 bits for each baud, 2400 bits are transmitted by 600 baud, or changes in states.

Faster modems are used by Internet users every day, notably cable modems and ADSL modems. In telecommunications, "radio modems" transmit repeating frames of data at very high data rates over microwave radio links. Some microwave modems transmit more than a hundred million bits per second. Optical modems transmit data over optical fibers. Most intercontinental data links now use optical modems transmitting over undersea optical fibers. Optical modems routinely have data rates in excess of a billion ($1 \times 10^9$) bits per second. One kilobit per second (kbit/s or kb/s or kbps) as used in this article means 1000 bits per second and not 1024 bits per second. For example, a 56 k modem can transfer data at up to 56,000 bits per second over the phone line.

Modems which use mobile phone lines (GPRS, UMTS, HSPA, EVDO, WiMax, etc.), are known as Cellular Modems. Cellular modems can be embedded inside a laptop or appliance, or they can be external to it. External cellular modems are datacards and cellular routers. The datacard is a PC card or ExpressCard which slides into a PCMCIA/PC card/ExpressCard slot on a computer. The most famous brand of Radio modem datacards is the AirCard made by Sierra Wireless. (Many people just refer to all makes and models as "AirCards", when in fact this is a trademarked brand name.) Nowadays, there are USB cellular modems as well that use a USB port on the laptop instead of a PC card or ExpressCard slot. A cellular router may or may not have an external datacard ("AirCard") that slides into it. Most cellular routers do allow such datacards or USB modems, except for the WAAV, Inc. CM3 mobile broadband cellular router. Cellular Routers may not be modems per se, but they contain modems or allow modems to be slid into them. The difference between a cellular router and a cellular modem is that a cellular router normally allows multiple people to connect to it (since it can "route"), while the modem is made for one connection.

Most of the GSM cellular modems come with an integrated SIM cardholder (i.e, Huawei E220, Sierra 881, etc.) The CDMA (EVDO) versions do not use SIM cards, but use ESN (Electronic Serial Numbers) instead. ADSL modems, a more recent development, are not limited to the telephone's "voiceband" audio frequencies. Some ADSL modems use coded orthogonal frequency division modulation (DMT).

Cable modems use a range of frequencies originally intended to carry RF television channels. Multiple cable modems attached to a single cable can use the same frequency band, using a low-level media access protocol to allow them to work together within the same channel. Typically, 'up' and 'down' signals are kept separate using frequency division multiple access.

New types of broadband modems are beginning to appear, such as doubleway satellite and powerline modems. Broadband modems can still be classed as modems, since they use complex waveforms to carry digital data. They are more advanced devices than traditional dial-up modems as they are capable of modulating/demodulating hundreds of channels simultaneously. Many broadband modems include the functions of a router (with Ethernet and WiFi ports) and other features such as DHCP, NAT and firewall features.

When broadband technology was introduced, networking and routers were unfamiliar to consumers. However, many people knew what a modem was as most internet access was through dialup. Due to this familiarity, companies started selling broadband modems using the familiar term "modem" rather than vaguer ones like "adapter" or "transceiver".

Direct broadcast satellite, WiFi, and mobile phones all use modems to communicate, as do most other wireless services today. Modem telecommunications and data networks also make extensive use of radio modems where long distance data links are required. Such systems are an important part of the public switched telephone network (PSTN), and are also in common use for high-speed computer network links to outlying areas where fiber is not economical.

Even where a cable is installed, it is often possible to get better performance or make other parts of the system simpler by using radio frequencies and modulation techniques through a cable. Coaxial cable has a very large bandwidth, however signal attenuation becomes a major problem at high data rates if a digital signal is used. By using a modem, a much larger amount of digital data can be transmitted through a single piece of wire. Digital cable television and cable Internet services use radio frequency modems to provide the increasing bandwidth needs of modem households. Using a modem also allows for frequency-division multiple access to be used, making full-duplex digital communication with many users possible using a single wire.

Wireless modems come in a variety of types, bandwidths, and speeds. Wireless modems are often referred to as transparent or smart. They transmit information that is modulated onto a carrier frequency to allow many simultaneous wireless communication links to work simultaneously on different frequencies.

Transparent modems operate in a manner similar to their phone line modem cousins. Typically, they were half duplex, meaning that they could not send and receive data at the same time. Typically transparent modems are polled in a round robin manner to collect small amounts of data from scattered locations that do not have easy access to wired infrastructure. Transparent modems are most commonly used by utility companies for data collection.

Smart modems come with a media access controller inside which prevents random data from colliding and resends data that is not correctly received. Smart modems typically require more bandwidth than transparent modems, and typically achieve higher data rates. The IEEE 802.11 standard defines a short range modulation scheme that is used on a large scale throughout the world.

Wireless data modems are used in the WiFi and WiMax standards, operating at microwave frequencies. WiFi is principally used in laptops for Internet connections (wireless access point) and wireless application protocol (WAP).

A cable modem is a type of modem that provides access to a data signal sent over the cable television infrastructure. Cable modems are primarily used to deliver broadband Internet access in the form of cable internet, taking advantage of unused bandwidth on a cable television network. They are commonly found in Australia, New Zealand, Canada, Europe, Costa Rica, and the United States. In the USA alone there were 22.5 million cable modem users during the first quarter of 2005, up from 17.4 million in the first quarter of 2004

Cable TV and Internet access on coaxial cable as well as broadcast television use some of the lower microwave frequencies. Some mobile phone networks, like GSM, also use the lower microwave frequencies.

Microwave radio is used in broadcasting and telecommunication transmissions because, due to their short wavelength, highly directive antennas are smaller and therefore more practical than they would be at longer wavelengths (lower frequencies). There is also more bandwidth in the microwave spectrum than in the rest of the radio spectrum; the usable bandwidth below 300 MHz is less than 300 MHz while many GHz can be used above 300 MHz. Typically, microwaves are used in television news to transmit a signal from a remote location to a television station from a specially equipped van.

The Electro-Industries/Gaugetech (EIG) Shark 100-S Electronic Sub-Meter with Advanced WIFI Ethernet Capability is one of the most advanced electrical sub meters. This high performance product is designed to measure revenue grade electrical energy usage and communicate back that information using modern communication mediums. The unit supports RS485, RJ45 Ethernet or IEEE 802.11 Wi-Fi© Ethernet connections. This allows it to be placed anywhere within a facility and have it communicate back to central software quickly and automatically. one of the most advanced electrical sub meters The unit uses standard 5 or 1 amp CTs (either split or donut). It surface mounts to any wall and is easily programmed in minutes. The unit is designed specifically to be a low cost, highly accurate sub meter with advanced communication and easy installation. The EIG Shark 100-S directly interfaces with most building management systems. Communication cab abilities include RS485, RJ45 Ethernet, or IEEE 802.11 WiFi© which make the Shark 100-S an easy and economical solution for many applications including universities, commercial buildings, shopping malls, industrial sub metering, and government facilities.

This unit provides a wide range of outputs. The unit can be equipped with any of the following communication mediums. IrDA Port for PDA Read Using the infrared port, the EIG Shark 100-S can view and capture data using either a laptop or a pocket PC based PDA. StandardRS485 Communication Standard communication includes an RS485 output speaking Modbus protocol. This allows the units to be connected to any serial RS485 bus using the Modbus interface. The unit will communicate easily with most building automation or other software systems.

Initially, the data from system 10 described above can be collectable by a communication receiver that is brought within 200 yards of the meter (short range radio communication). The data transfer as a minimum can include meter serial number and kilowatt hours transferred. The future data transfer can also include temperature data, wind speed and direction data, vibration data, bearing temperature data and other maintenance data. This data can be gathered in real time and stored in the turbine, or elsewhere, in a digital format until the transmission is electronically accepted. This data can provide operation and wear conditions of the turbine without forcing one to visit the turbine. In addition, this data can be tied into a general wind turbine data base monitoring system that can automatically identify when maintenance is required, recommended and/or will be needed soon. The data base system can track trends and have pre-programmed limits set such that it will be able to flag system problems with warning lights, and alarms before a problem occurs. This can support the automatic operation mode for the turbines. Subsequent meters can have the capability to transfer the data over much longer distances. This can be accomplished by use of satellite communication, such as a satellite telephone, microwave communication to a tower which can be routed to the correct office, connection to telephone and/or cable lines on the power poles, or sending the information on the power lines with the use of a carrier signal.

Wind Turbine Mounting

Figure 7:
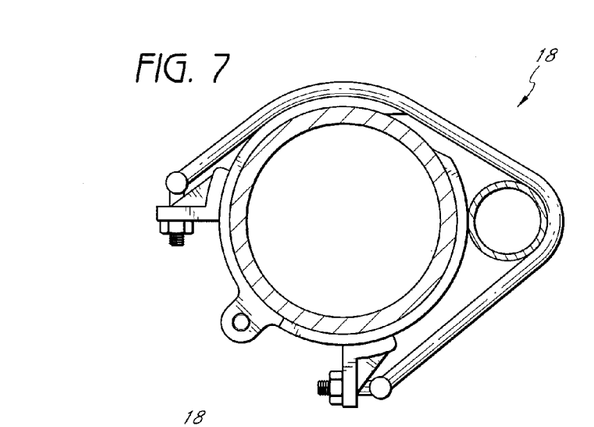
FIG. 7 is an illustration of an embodiment of a split ring which can be used to connect a wind turbine to an existing power pole.
Figure 8:
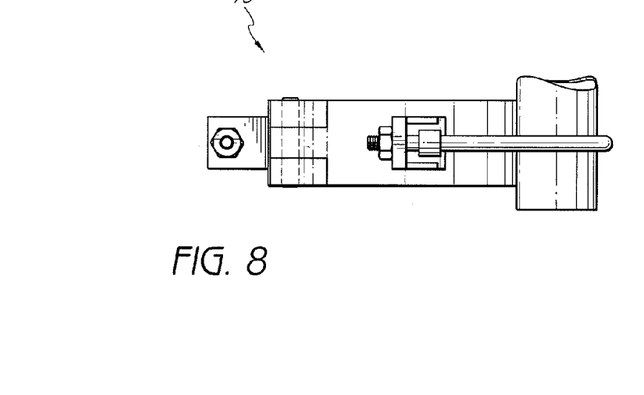
FIG. 8 is a further illustration of the embodiment of FIG. 7.
Figure 9:
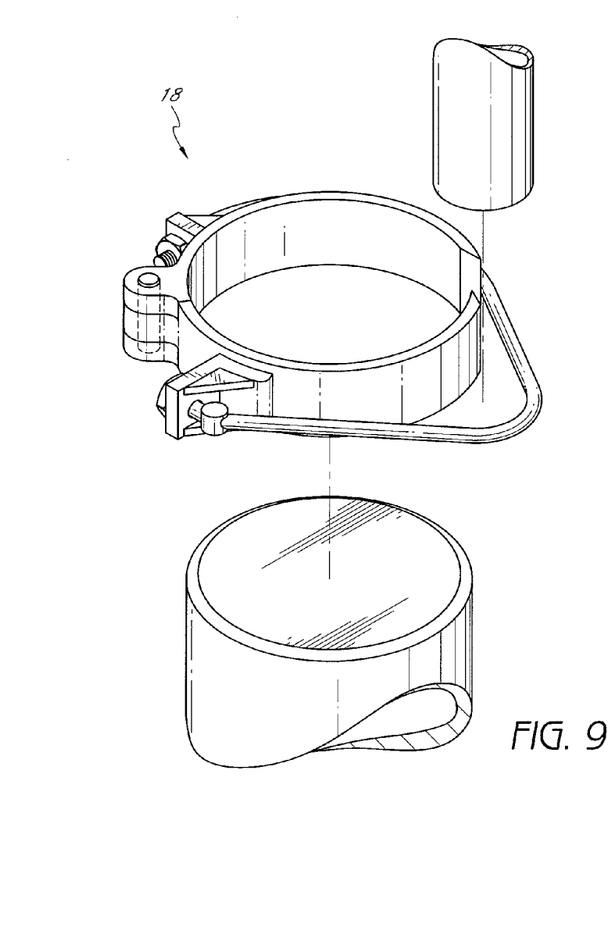
FIG. 9 is an exploded view illustration of the embodiment of FIG. 7.
Figure 10:
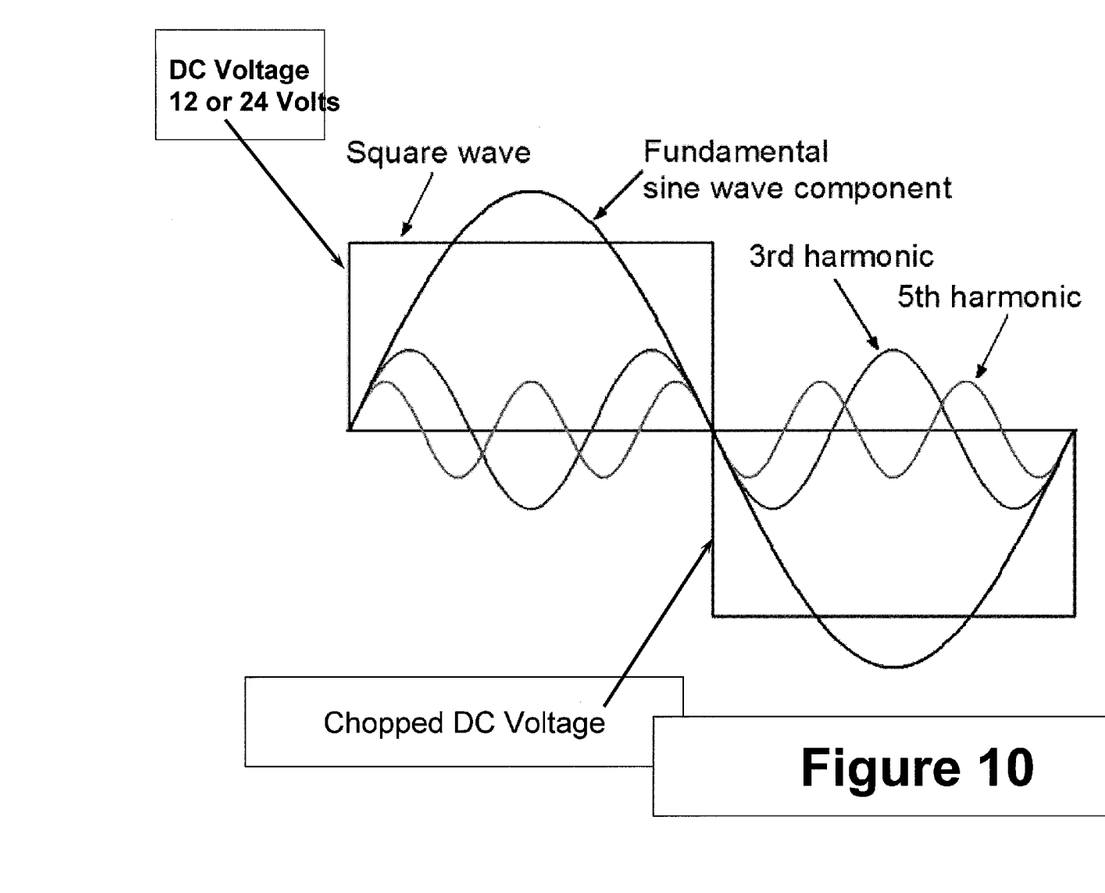
FIG. 10 is a schematic illustration of AC and DC voltage.

As described above, the systems described herein can include one or more wind turbines 12 that can be mounted on existing power poles, light poles, power transmission towers and/or any other existing tall structure or pole where power can be connected to the grid. In some embodiments, and with reference to FIGS. 7-9, one type of mounting can consist of a split ring 18 that can be bolted to the power pole. The split ring 18 can be in the shape of a figure eight and have various sizes to fit on power poles of different diameters. One ring of the figure eight can hold the wind turbine pole in place and, in some embodiments, can nominally be sized for a 2" pole. These split rings 18 can be bolted, for example, to the power poles.

While the foregoing written description of embodiments of the invention enables one of ordinary skill to make and use what is considered presently to be the best mode thereof, those of ordinary skill will understand and appreciate the existence of variations, combinations, and equivalents of the specific exemplary embodiments and methods herein. The invention should therefore not be limited by the above described embodiment and method, but by all embodiments and methods within the scope and spirit of the invention as claimed.

What is claimed is:

1. A wind power generation system comprising:
a plurality of spaced apart wind turbines mounted on existing power grid structures and integrally connected with an existing power grid to deliver wind generated electrical energy to the power grid, each of the wind turbines comprising a metering device for providing and collecting information about the wind turbine's electrical power generation, and a data transfer device to transfer data from each meter to a central data collection area, wherein the transfer data comprises data about each turbine's serial number and kilowatt hours transferred.

2. The system of claim 1, wherein the plurality of turbines comprises turbines with outputs in the range of 0.1 to 10 kW.

3. The system of claim 1, wherein the plurality of turbines comprises turbines with outputs in the range of 3 to 15 kW.

4. The system of claim 1, wherein the plurality of wind turbines comprises both vertical and horizontal wind turbines.

5. The system of claim 1, wherein the plurality of wind turbines comprises at least one wind turbine with variable pitch blades.

6. The system of claim 1, wherein the plurality of wind turbines comprises both commercially available and custom-built wind turbines.

7. The system of claim 1, The system of claim 1, wherein the plurality of wind turbines are spaced apart between approximately 1.5 and 3 times the diameters of the blades from side to side, and at lengths of approximately 7 to 13 times the diameter of the blades downwind from one another.

8. The system of claim 1, wherein each of the turbines comprises power conditioning equipment including an oscillator synchronized with the existing power grid.

9. A method of generating electricity comprising:
mounting a plurality of wind turbines on existing power poles;
integrally connecting the wind turbines with an existing power grid, such that power conditioning equipment within each turbine matches the power and frequency of the power wires at each power pole, and electricity generated by each turbine can be integrated into the existing power grid;
monitoring each wind turbine and collecting data on each wind turbine's performance;
transferring the collected data to a central location; and
making adjustments to the plurality of wind turbines in response to the remote monitoring,
wherein mounting comprises spacing apart the wind turbines based on factors including but not limited to blade diameter of each wind turbine, surface of the land in which the wind turbine is mounted, the approximate location of other wind turbines, surface conditions of the land, the angle of the wind, wind turbulence, wind gusts, wind variations, and mounting height.

10. The method of claim 9, wherein the plurality of turbines as a whole produce between 2 and 10,000 MW of power output.

11. The method of claim 9, wherein the collection of data comprises bringing a communication receiver within 200 yards of each meter and transferring data from each meter to the communication receiver via short range radio communication.

12. The method of claim 9, wherein the collection of data comprises collecting information about each turbine's serial number and kilowatt hours transferred.

13. The method of claim 12, wherein the collection of data further comprises collecting data on temperature, wind speed, wind direction, vibration, and bearing temperature of each wind turbine in the system.

14. The method of claim 9, wherein transferring the collected data comprises sending the data through satellite communications to the central location.

15. The method of claim 9, wherein transferring the collected data comprises using infrared transmission.

16. The method of claim 9, wherein transferring the collected data comprises using carrier wave transmission.

17. The method of claim 9, wherein transferring the collected data comprises sending the data through a modem device to the central location.

18. The method of claim 9, wherein adjusting the plurality of wind turbines comprises replacing or repairing a wind turbine based on data collected from the wind turbine.

19. The method of claim 9, wherein mounting comprises using a split ring device to mount each turbine to a power pole.

20. A method of generating electricity comprising:
mounting a plurality of wind turbines on existing power poles;
integrally connecting the wind turbines with an existing power grid, such that power conditioning equipment within each turbine matches the power and frequency of the power wires at each power pole, and electricity generated by each turbine can be integrated into the existing power grid;
monitoring each wind turbine and collecting data on each wind turbine's performance;
transferring the collected data to a central location; and
making adjustments to the plurality of wind turbines in response to the remote monitoring, wherein the collection of data comprises collecting information about each turbine's serial number and kilowatt hours transferred.

* * * * *